Oct. 29, 1957 — M. E. FRY — 2,811,627
DOMESTIC APPLIANCE
Filed Nov. 1, 1954 — 3 Sheets-Sheet 1

INVENTOR.
Millard E. Fry
BY R. R. Candor
His Attorney

INVENTOR.
Millard E. Fry
BY R R Candor
His Attorney

United States Patent Office 2,811,627
Patented Oct. 29, 1957

2,811,627

DOMESTIC APPLIANCE

Millard E. Fry, Dayton, Ohio, assignor to General Motors Corporation, Detroit, Mich., a corporation of Delaware Application November 1, 1954, Serial No. 466,027

10 Claims. (Cl. 219—20)

This invention relates to a domestic appliance and more particularly to an improved thermostatic control of the surface heaters of domestic electric ranges.

A wide variety of food preparation is performed on the surface heaters of domestic ranges. This includes warming, simmering, boiling, low temperature frying and French or deep fat frying. These operations are normally performed by first heating the vessel at the maximum heating input; then, to prevent overheating, the heating input should be lowered to a value which will properly maintain the cooking operation after the food has reached the desired temperature. Frequent attention by the operator is necessary to insure satisfactory heating, as failure to lower the heating input at the proper time or to a rate sufficiently reduced for continuous cooking or heating may cause scorching or burning or a less satisfactory taste, or other unsatisfactory conditions.

Many automatic temperature controls for surface heaters have been devised heretofore but have not been commercially successful for a number of reasons. Some were too complicated and expensive. Many were not sufficiently responsive to the temperature attained by the cooking vessel or were satisfactory only for certain types of surface food preparation.

It is old to use a temperature sensing element mounted in an aperture in the center of an electric heating unit which is responsive to the temperature of a cooking utensil placed upon the unit to control the heat input to the heating unit by opening and closing an electric circuit so that the temperature of the cooking utensil and its contents are maintained at a reasonably constant cooking temperature. With a sufficiently sensitive thermostatic control adequate cooking results can be obtained in the temperature range above the coiling range, i. e. above 212° F. for frying, pressure cooking, etc. However, for those foods to be cooked by boiling or steaming, such previously known controls are ineffective in that when boiling, the temperature of the water in a utensil remains constant, i. e. 212° F. at sea level. Hence, even a slight variation in the temperature setting of the thermostat may result in the highest heat input to the electric heater remaining on continuously with resulting rapid evaporation of the water, so the food soon boils dry. Or, if set too low, the boiling temperature is never attained. It is an essential object of our invention to provide a temperature control for range surface units which provides satisfactory control of utensil temperatures which may be preselected from a low warming temperature such as 150° F. up through the boiling or steaming range and on up through desirable frying temperatures, i. e. 250° to 275° F., and even into the higher temperatures required for deep fat cooking, i. e. 375° to 450° F.

I accomplish this by utilizing a hydraulic type of temperature sensing element located in the center of the heating unit which actuates a remotely located bellows or diaphragm which accurately opens and closes in succession two separate slow make and break electrical contacts at a fixed temperature differential between the two controlling electrothermal relays connecting to the heating unit such that upon initial heating, the heating unit is operated at maximum input until the first contact opens. This first contact is set at the lower of the two temperatures. Upon its opening the input to the unit is reduced to any one of several lower preselected rates to maintain the desired cooking temperature. Should the temperature of the vessel then continue to rise, the second contact opens and shuts off all heat input to the unit. Upon cooling, the second contact recloses to again supply heat to the vessel, thus maintaining the desired temperature with minimum fluctuation.

When food is to be boiled, the temperature setting of the control is such that the first set of contacts opens the maximum heating circuit at a temperature below the boiling range, i. e. approximately 200° F. and automatically reduces the heating input to anyone of several preselected values which will continue the desired rate of boiling. Simultaneously with setting the temperature such that the first set of contacts opens the heating circuit at a point below the boiling temperature, as explained above, the second set of contacts is set for a temperature above the boiling range, i. e. 225° F. so that if the water boils away and the temperature rises to 225° F. the second set of contacts opens and cuts off the input to avoid any tendency of the food to burn. This provides complete and effective control of all boiling and steaming operations which has not heretofore been available except with very complicated controls. The control system described is equally effective for low temperatures below boiling when the control is set for such temperatures.

The control system described above has the further advantage of providing a more flexible and satisfactory control of various surface unit cooking operations than has heretofore been devised in that cooking starts at the maximum heat input available, then is automatically reduced to any one of several lower inputs as the temperature of the vessel approaches the desired temperature, thus preventing the tendency for the vessel temperature to overshoot. Further, heating input is automatically reestablished at the maximum rate should cold food be added to the vessel during the cooking operation.

It is an object of my invention to provide a simple two step thermostat with low differentials and slow make and break contacts operating upon a low voltage and to provide a low cost reliable quiet thermal relay system and control coordinated with the adjustment of the thermostat to provide fast initial heating of a multiple heat surface heater to any preselected temperature followed by a change to any one of several reduced heating rates preselected according to the adjustment of the thermostat.

It is another object of my invention to provide an interchanging control arrangement between the two step thermostat and the terminals of a multiple section surface heater in such a way as to provide several preselected reduced heating rates following the fast initial heating.

These and other objects are attained in the preferred form shown by providing a resiliently mounted liquid filled thermostatic element in the center of a surface heater. The element is provided with a hydraulic connection to a remote metal bellows or diaphragm which controls the opening and closing in succession of two electrical contacts in a low voltage circuit. Both electrical contacts controlling the heating circuits are closed when the element is cold, with the result that initial heating of the cooking vessel is at the maximum power input available from the surface unit. The opening of the first of these contacts controls one or more electrothermal relays to disconnect selectively several heating circuits for reducing the heating input to either of two or more preselected lower inputs. The subsequent opening of the second contact controls an additional electro-thermal relay for deenergizing the entire surface unit. As the temperature of the vessel drops, the second contact is reclosed to again bring the vessel back up to the desired cooking temperature. This alternate heating and cooling continues as long as desired. The operating temperatures are selected by adjusting the location of the bellows or diaphragm. This adjustment is also used to change the connections between the electrical contacts and the electro-thermal relays to provide the different lower inputs following the additional heating.

Further objects and advantages of the present invention will be apparent from the following description, reference being had to the accompanying drawings wherein a preferred form of the invention is clearly shown.

Figure 1:
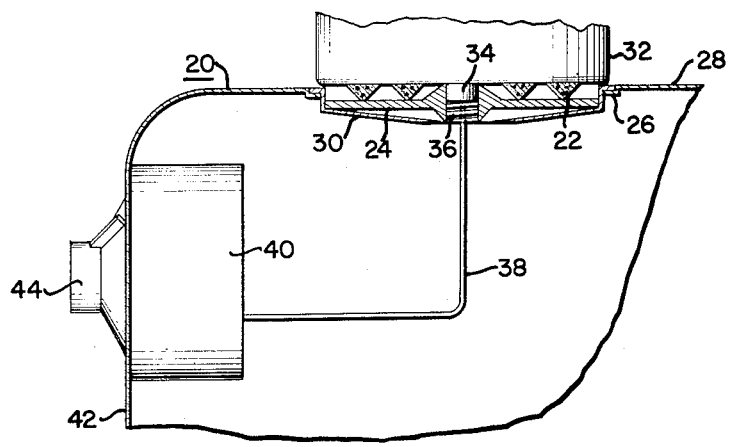
Figure 1 is a fragmentary vertical sectional view of a range and surface heater provided with an automatic thermostatic control embodying my invention.

Referring to the drawings and more particularly to Figure 1 there is shown a domestic electric range 20 having a surface heater 22 supported upon a support 24 within a flanged aperture 26 in the range top 28. Beneath the heater 22 and the support 24 is a drip pan 30. The surface heater may be of the sheath tubular type containing two or three elements in parallel such as for example as shown in the Tuttle Patent No. 2,508,552, issued May 23, 1950. The surface heater 22 is adapted to support the cooking vessel or receptacle 32. Such a heater and vessel may be used for any sort of cooking for which a surface heater may be used. In the central portion of the surface heater 22 there is provided a hydraulic thermostat bulb 34 pushed upwardly by a coil spring 36 mounted in the support 24. The hydraulic thermostat bulb 34 is connected by a capillary tube 38 to the automatic thermostatic control 40 mounted behind the front 42 of the range 20. The control 40 has an adjusting dial 44 mounted on the outside of the range front 42 for adjusting the thermostat and the circuit controls within. The general organization shown in Figure 1 applies to the three different forms of the invention shown diagrammatically in Figures 2, 3 and 4.

Figure 1. This system is filled with a hydraulic liquid and forms a part of an accurate slow make and break two step thermostat having switch members 48 and 50 in a low voltage relay circuit adjusted to be opened successively with a differential of 25° F. The bellows or diaphragm 46 is arranged to have its follower first engage the first step switch member 48 to move it away from its stationary contact 52. The switch member 50 is provided with an adjustable screw 54 having its end portion spaced away from the switch member 48 a sufficient distance to cause the bulb 34 to rise to a temperature of 25° higher than the opening point of the switch member 48 before the first step switch member 48 is moved far enough to engage the end of the adjustable screw 54. When the switch member 48 engages the end of a screw 54 the second step switch member 50 will be moved away from its stationary contact 56. This arrangement with the low applied voltage and the slow make and break contact arrangement insures that the switch member 50 will always open at a temperature which is 25° F. higher than the temperature at which the switch member 48 is opened throughout the life of the thermostat since contact wear and burning are minimized. Upon a fall in temperature these switch members 48 and 50 will close at substantially the same temperatures at which they open.

The temperature at which the switch member 48 is opened is adjusted by a peripheral cam 58 having a follower 60 which adjusts the location of the bellows or diaphragm means 46. This cam 58 is connected by a shaft 62 to the adjusting knob 44 provided upon the range front 42 as shown in Figure 1. This cam 58 includes a raised "off" portion 64, a portion of gradually reducing radius extending between the "off" portion and a point indicated by the reference character 66, a portion of constant radius extending between the points indicated by the reference characters 66 and 68 and an additional portion of gradually reducing radius extending between the points 68 and the raised "off" portion 64. The portion between the points 66 and 68 is arranged to adjust the location of the diaphragm or bellows 46 to cause the opening of the contact member 48 at 200° F. The purpose of this is to provide a knob adjustment suitable for boiling which will rapidly bring up the vessel 32 to a temperature of 200° and thereafter to make it possible to provide at least three different preselected heating rates after this temperature is reached which can be preselected by the adjustment of the knob within a certain range.

For this purpose the knob is provided with an indicator 70 which cooperates with a scale or legends on the base of the range front 42. This scale includes two markings of 200° so located and spaced apart that when the indicator is pointed to them, that portion between the refer-

THE FIRST FORM

*Contact chart*

| Pos. | Sections | | Contacts | | | | | | | | |
|---|---|---|---|---|---|---|---|---|---|---|---|
| | 161 | 159 | 121 94 | 121 125 | 131 125 | 131 96 | 129 98 | 48 52 | 50 56 | 165 | 145 |
| Off | 0 | 0 | Open | Open | Open | Open | Open | Open | Open | Open | Open |
| PH Low | 236 v. series | 118 v. | Close Close | Open Open | Close Close | Open Close | Open Open | Close Open | Close Close | Close Open | Close Close |
| PH Med | 236 v. 0 | 118 v. 118 v. | Open Open | Close Close | Open Open | Close Close | Open Open | Close Open | Close Close | Close Open | Close Close |
| PH High | 236 v. 236 v. | 118 v. 118 v. | Open Open | Close Close | Open Open | Close Close | Close Close | Close Open | Close Close | Close Close | Close Close |

Figure 2:
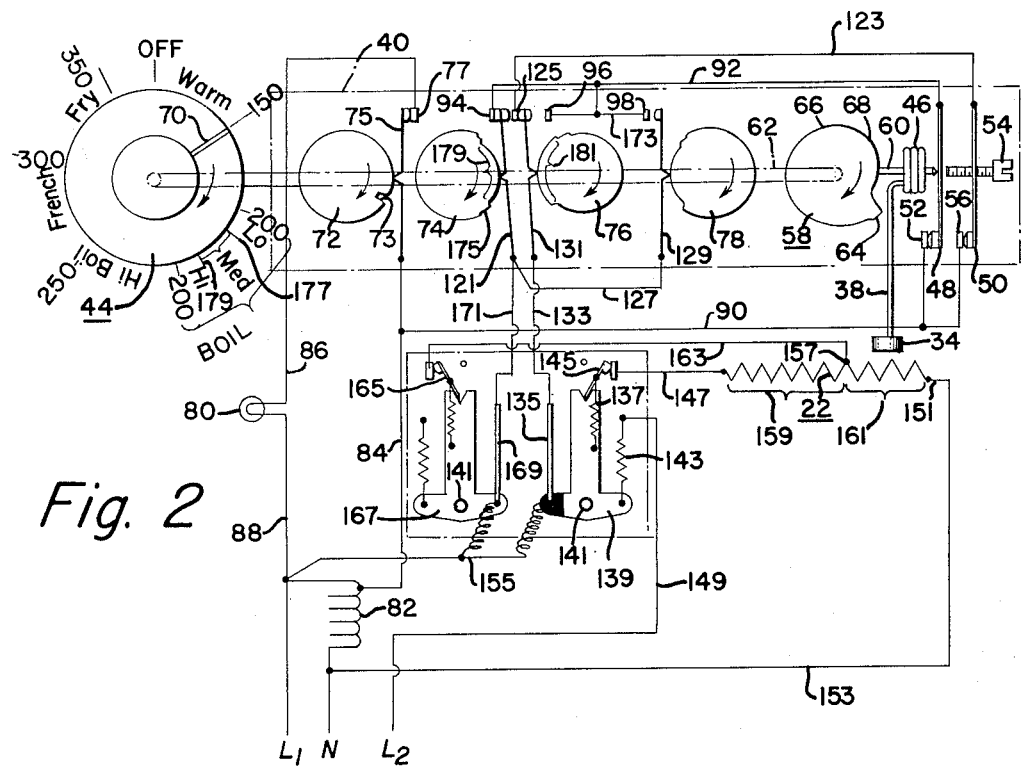
Figure 2 is a diagrammatic view of the automatic surface heater thermostat and electrical control system embodying one form of my invention.

In Figure 2 the control 40 is provided with a bellows or diaphragm 46 connected to the capillary tube 38 which in turn is connected to the hydraulic bulb 34 as shown in ence characters 66 and 68 of the cam 58 is presented to the cam follower 60. The temperature markings extend upwardly in a clockwise direction from this zone to the off indication and also extend downwardly from this zone in the counter-clockwise direction to the off location. The portion of the knob between the two 200 scale markings is divided into three zones with the middle zone constituting the medium heat zone. The portion in the counterclockwise direction is marked "low boil" and the portion in the clockwise direction being marked "high boil." The frying range extends in a clockwise direction above the high boiling position while the warming range extends in a counter-clockwise direction below the low boil position.

This knob and cam arrangement makes possible the adjustment of the electric circuits in the boiling range to obtain different heating rates after the initial or preheating period without any change in temperature. For this purpose the shaft 62 has fixed thereon four cams designated by the reference character 72, 74, 76 and 78. The cam 72 is provided with a notch 73 into which falls the follower of the switch member 75 which separates from the stationary contact 77 in the off position only of the knob 44. In all other positions the cam 72 closes the contacts 75 and 77 to connect the pilot lamp 80 across the low voltage output terminals of an auto transformer 82 through the conductors 84, 86 and 88. The auto transformer 82 has its input terminals connected to the live supply conductor $L_1$ and to the neutral supply conductor N. These supply conductors $L_1$ and N together with a third supply conductor $L_2$ form the supply conductors of a three wire single phase alternating current supply providing a nominal voltage of 118 v. between the neutral conductor 18 and either of the live conductors $L_1$ and $L_2$ and providing a nominal voltage of 236 volts between the supply conductors $L_1$ and $L_2$. This foregoing portion of the description pertains to all three modifications illustrated. The output connection of the conductor 84 to the auto transformer 82 is so located that the voltage of only about 2½ volts is impressed across the conductors 84 and 88. This auto transformer 82 may also be used to supply low voltage current to other surface heater controls, other pilot lights and other controls for the range.

This low voltage supply is used in the specific circuits of the contacts 48 and 50 so that these contacts may be of the slow make and break type with very low differentials and be free of contact burning and calibration drift. The low voltage conductor 84 is connected by the conductor 90 to the stationary contacts 52 and 56 of the two step thermostat. The movable contact 48 is connected by the conductor 92 to the stationary contacts 94, 96 and 98. The contact 94 is adapted to be contacted by a double throw contact member 121 provided with a follower in engagement with the periphery of the cam 74. The movable contact 50 is connected by a conductor 123 to a stationary contact 125. The contact 121 is connected by the conductor 127 to a movable contact 129 cooperating with the stationary contact 98 and having a cam follower in engagement with the periphery of the cam 58 to control its position. Another double throw switch contact No. 131 is provided for alternately contacting the stationary contacts 96 and 125. All these movable contacts 75, 121, 131 and 129 have an inherent spring bias in the direction keeping their followers in contact with their respective cams.

The contact 131 is connected by the conductor 133 to the thermal actuating element 135 of the hot wire type of snap acting electro thermal relay 137. The normally open electro thermal relay 137 includes a lever 139 pivotally mounted upon an insulated pin 141 having one arm connected through an insulating connection with one end of the hot wire 135 and having another arm connected to a tension spring 143. This spring 143 urges the lever 139 in a counter-clockwise direction about the insulated pivot pin 141 to keep a substantially constant pulling force upon the hot wire 135. The lever 139 also is connected by a toggle spring and notch pivot to a snap acting single toggle contact mechanism 145. The stationary contact of this contact mechanism is connected by a conductor to the terminal 147 of the surface heater 22. The practical embodiment of this and other relays disclosed herein may be of the type shown in the Werner Patent No. 2,242,769, issued May 20, 1941. In this particular application however the parts of said switch in said patent designated by the reference character 51b, 60b, 57b, 64b, 80 and 65b are omitted. However other forms of relays may also be used.

The contact mechanism 145 is adapted to connect the terminal 147 of the surface heater 22 through the lever 139 to the conductor 149 connecting with the supply conductor $L_2$. The terminal 151 at the opposite end of the surface heater 22 is connected by the conductor 153 to the neutral supply conductor N. The insulated terminal portion of the hot wire 135 is connected by a flexible conductor 155 to the supply conductor $L_1$. The surface heater 22 is provided with an intermediate tap 157 which divides the heater into a low resistance portion 161 and a high resistance portion 159. The tap 157 is connected by the conductor 163 to the toggle contact mechanism 165 of a second hot wire type normally open snap acting electro thermal relay 167. This relay 167 is connected by a flexible conductor through the conductor 155 and the conductor 88 to the live supply conductor $L_1$. The relay 167 is actuated by the hot wire 169 connected through the conductors 171 and 127 to the movable contacts 121 and 129 connecting through the contacts 94 and 98 and the conductor 92 to the first step switch member 48.

The peripheral surface of the cam 74 is so arranged so that when the knob 44 is in the off position, the switch member 121 presents a portion 175 of intermediate radius to the follower to hold the switch member 121 at a position intermediate the contacts 94 and 125. When the knob 44 is in any position in the warming and low boil range extending to the knob position indicated by the reference character 177 the cam 74 will present a portion 179 of lesser radius which will cause the switch member 121 to move against the contact 94.

This will cause current flow from the supply conductor $L_1$ through the conductors 88, 155, hot wire 169, the conductor 171, the contact member 121, the contact 94, the conductor 92, the first step switch member 48 and the conductors 90 and 84 to the low voltage terminal of the autotransformer 82. The heating effect of current flow will cause the hot wire 169 to lengthen and cause the lever of the relay 167 to pivot in the clockwise direction to close the contacts 165. The turning away of the knob 44 of the off position also turns the cam 76 so that the high portion 181 is presented to the cam follower of the switch member 131 to cause its engagement with the stationary contact 125. The cam 58 also is turned to a position to cause the closing of the first and second step switch members 48 and 50. This closes a circuit extending from the conductor $L_1$ and the conductors 88, 155, the hot wire 135, the conductor 133, the switch member 131, the contact 125, the conductor 123, the second step switch member 50 and the conductors 90 and 84 to the low voltage terminal of the autotransformer 82. This heats the hot wire 135 causing the lever 139 to pivot counter-clockwise to cause the contacts 145 to connect the terminal 147 through the relay 137 and the conductors 143 and 149 to the live supply conductor $L_2$.

Thus it will be observed that only the voltage impressed across the low voltage output terminals of the autotransformer 82 is applied to the pilot lamp 80, the hot wires 169 and 135 and the switch contact members 121, 131, 129, 48, 50 and 76. This voltage may be quite low such as 2½ volts so that the current may be kept at low amperage to minimize burning, sticking or evaporating of contact point and drifting of the thermostat settings. Also electrical clearances and blade size may be reduced to a minimum because of the low voltage supply and low current carried. The snap acting contacts 145 and 165 are capable of carrying a heavy current which does not affect the calibration of the control.

Operation of the first form

In the warm and low boil positions, as long as both the first and second step contacts 48 and 50 remain closed, current will flow from the conductor $L_2$ through the conductor 149, the spring 143, relay 137, the contacts 145 to the terminal 147 of the heater 22 and through the low resistance section 159 to the tap 157 and through the conductor 163, the switch contacts 165, the relay 167 and the conductor 155 to the supply conductor $L_1$. This connects the high resistance section 159 across the supply conductors $L_1$ and $L_2$ to impress 236 volts thereon. For a six inch heater, this section may have a resistance of about 56 ohms to provide an input of 1000 watts and for an eight inch heater this section may have a resistance of 41.4 ohms to provide an input of 1350 watts. Current will also flow from the tap 157 through the low resistance section 161 through the terminal 151 and the conductors 153 to the neutral supply conductor N. This will apply a voltage of 118 volts to the low resistance section 161. For a six inch surface heater, this low voltage section 161 may have a resistance of about 27.2 ohms which for an eight inch heater this section may have a resistance of 20 ohms. These resistances will provide a heat input on 118 volts of 500 watts for the six inch unit and 700 watts for the eight inch unit. Thus as long as the switches are in the position described, the total input will be 1500 watts for the six inch unit and 2050 watts for the eight inch unit.

When the vessel or receptacle 32 comes up to the temperature which is indicated by the position of the knob 44 in the warming and low boiling settings, the hydraulic liquid within the thermostat bulb 34 will be expanded enough to expand the diaphragm 46 sufficiently to open the first step switch 48. The second step switch 50 however will remain closed. The opening of the first step switch 48 will deenergize the control circuit of the hot wire 169 to cause the relay 167 to open the contact mechanism 165 to disconnect the tap 157 from the supply conductor $L_1$. This will leave the terminal 147 connected to the supply conductor $L_2$ and the terminal 151 connected to the neutral supply conductor. Therefore both sections are connected in series across 118 volts to provide a very low heating rate of 170 watts for the six inch unit and 230 watts for the eight inch unit to provide a heat suitable for the continuation of either warming or a slow boil operation. This heat is sufficiently low to prevent the burning of food and to prevent overshooting of the desired temperature as well as to minimize any evaporation.

In Figure 2 the knob 44 is shown with the indicator 70 pointing to a warming heat of 150°. The preheat (PH) circuit will bring the food within the receptacle 32 rapidly to this temperature by the maximum heat provided at the input of 1500 watts in the six inch unit and at an input of 2050 watts for the eight inch unit. After the 150° temperature is reached the warming continues at a rate of 170 watts on the six inch unit and 230 watts on the eight inch unit. This heat is sufficient to maintain the temperature of the vessel or receptacle 32 and its contents at the temperature of 150°. If the temperature of the vessel 32 and its contents should rise above 175° a second step switch 50 will be opened to prevent burning of the contents.

If the knob 44 is turned farther to the low boil position the cam 58 will be turned to a position in which the follower contacts the first portion between the reference characters 66 and 68 to cause the first step switch 48 to be opened when the thermostat bulb 34 reaches a temperature of 200° F. The cams 74, 76 and 78 will not reach any points of change in this rotation of the knob 44 so that the contacts controlled by them will not change. The receptacle 32 will be heated at the maximum rate until the temperature of 200° F. is reached after which first step 48 will open to deenergize the hot wire 169 to cause the relay 167 to open its contact mechanism 165 to disconnect the tap terminal 157 from the supply conductor $L_1$. This places both sections 159 and 161 in series across the supply conductor N and $L_2$ to provide a heat input of 170 watts on the six inch unit and 230 watts on the eight inch unit. This low heating rate is sufficient to raise the temperature slowly from 200° F. to the boiling point and keep the contents of the vessel 32 at a slow boil. Should the vessel 32 boil dry the second step switch 50 will open the relay contact 145 to completely deenergize the heater 22. This temperature cut off is sufficiently low to prevent burning when a vessel is boiled dry.

The medium boil position

The middle third of the space between the two 200° indications is provided for the medium boil position. When the knob 44 is turned to place the indicator so as to indicate this medium boil position the cam 58 is turned to bring the medium portion of the constant radius section between the points 66 and 68 on the periphery of the cam 58 in contact with the follower 60. This will cause the diaphragm 46 to continue to open the first step switch contact 48 when the thermostat bulb 34 reaches a temperature of 200° F. It will also cause the second step switch contact 50 to be opened at a temperature of 225° F. The cam 74 will be turned to present its high section to the follower of the movable switch contact 121 to move it into engagement with the stationary contact 125. The cam 76 will be rotated to present the low portion of the cam periphery to the follower of the movable switch contact 131 to place it in contact with the stationary contact 96. The cam 78 will also turn but the follower of the movable switch contact 129 will remain on the low portion of the periphery of this cam so that the movable switch contact 129 will remain in the position shown in Figure 2.

This will interchange the energizing circuits of the hot wires 169 and 135 of the relays 167 and 137. The hot wire 169 will be connected in series with the second step switch 50 while the hot wire 135 will be connected in series with the first step switch 48. This will not change the circuit during the initial warm up or preheating period but the opening of the first step switch 48 when the temperature of 200° F. is reached will now cause the hot wire 135 to be deenergized thereby causing the relay 137 to open the contacts 145 to disconnect the terminal 147 from the power supply. This will allow the low resistance section 161 to remain connected across the supply conductors $L_1$ and N at a nominal voltage of 118 to provide an input of 500 watts for the six inch unit and 700 watts for the eight inch unit. This is sufficient to provide a heating rate for medium boiling. It is relied upon to continue the heating from 200° F. up to the boiling point of water in the receptacle or vessel 32 and to keep the water boiling at a medium rate.

The high boil and fry positions

When the indicator 70 of the knob 44 is turned beyond the medium boil range, that is beyond the reference character 179 to a point intermediate the reference character 179 and the adapted designation 200, the follower 60 will be kept in the portion of the cam 58 between the reference characters 66 and 68 so that the first step switch 48 will continue to open at 200° F. The cam 74 will continue to present its high portion to the follower of the switch 121 to keep it in contact with the stationary contact 125. The follower of the switch 131 will remain on the low portion of the periphery of the cam 76 to keep it in contact with the stationary contact 96. The cam 78 however will move its high portion into contact with the follower of the switch 129 thereby moving it into contact with the stationary contact 98. This will substantially render ineffective the first step switch 48 since it will be shunted out by having the second step switch 50 connected through the conductor 123, the stationary contact 125 and the switch contact 121 to the hot wire 169. This same second step switch contact 50 is also connected through the conductor 123, the stationary contact 125, the switch 121, the conductor 127, the switch 129, and the stationary contact 98 which is connected to the stationary contact 96 by the conductor 173. The stationary contact 96 is connected through the switch 131 and the conductor 133 to the hot wire 135. Thus the energization of both hot wires 169 and 135 is continued by the second step switch 50 after the opening of the first step switch 48. This provides rapid boiling which will continue as long as there is any water in the vessel or receptacle 32.

Not until the temperature of the bulb rises to 225° will there be any reduction in the heat rate and when this temperature is reached both relays 137 and 167 will be simultaneously deenergized to disconnect the terminals 147 and 157 of the heater 22 from the live supply conductors L₁ and L₂. This will keep the surface heater 22 deenergized until the temperature falls below 225° at which time the second step switch 50 will reclose to reenergize the hot wires 135 and 169 to reclose the contact mechanisms 145 and 165 to resume the heating of the surface heater 22 to keep its temperature at 225° F.

The turning of the knob to higher temperature positions above high boil will rotate the cams 72, 74, 76 and 78 but will not present any cam surfaces of different radius to their followers so that there will be no change in the heating circuits. The only change will be at turning of higher portions of the cam 58 into contact with the follower 60 to raise the opening temperatures of the first and second switches 48 and 50.

THE SECOND FORM

Contact chart

| Pos. | Sections | | Contacts | | | | | Watts |
|---|---|---|---|---|---|---|---|---|
| | 161 | 169 | 48 52 | 50 56 | 222 | 232 | 238 | |
| Off | 0 | 0 | Open | Open | Open | Open | Open | 0 |
| PH Low | 236 v. in series | 118 v. | Close Open | Close Close | Close Close | Close Open | Close Close | 1,500 170 |
| PH Med | 236 v. 0 | 118 v. 118 v. | Close Open | Close Close | Close Open | Close Close | Close Close | 1,500 500 |
| PH High | 236 v. 236 v. | 118 v. 0 | Close Open | Close Close | Close Close | Close Close | Close Open | 1,500 1,000 |

Contact chart

| Pos. | Sections | | Contacts | | | | | |
|---|---|---|---|---|---|---|---|---|
| | 161 | 169 | 258 253 | 258 246 | 274 246 | 274 254 | 284 256 | 284 248 |
| Off | 0 | 0 | Open | Open | Open | Open | Open | Open |
| PH Low | 236 v. in series | 118 v. | Close Close | Open Open | Close Open | Open Open | Close Close | Open Open |
| PH Med | 236 v. 0 | 118 v. 118 v. | Open Open | Close Close | Open Open | Close Close | Close Close | Open Open |
| PH High | 236 v. 236 v. | 118 v. 0 | Close Close | Open Open | Open Open | Close Close | Open Open | Close Close |

Figure 3:
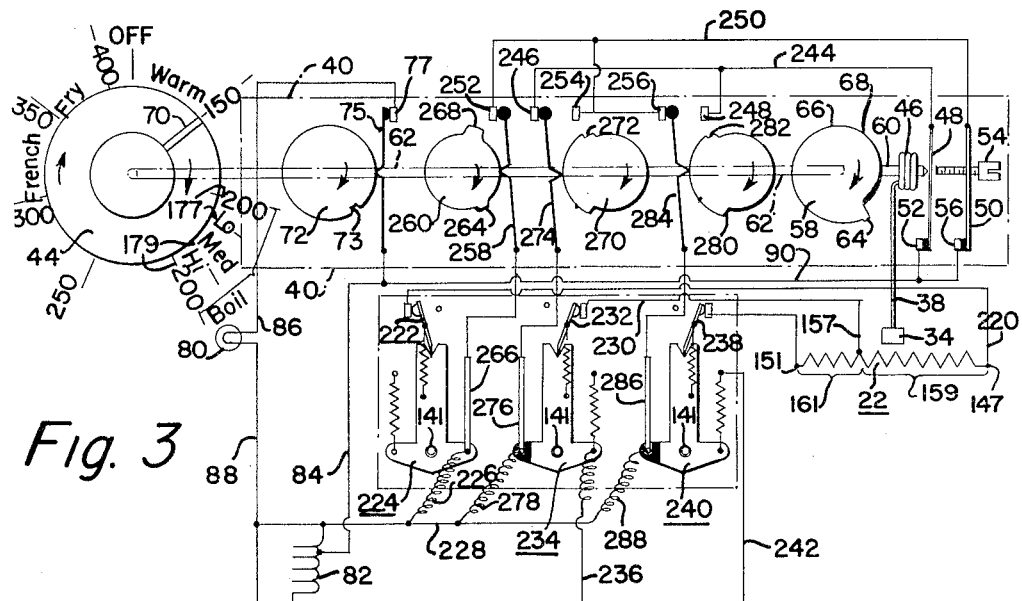
Figure 3 is a diagrammatic view similar to Figure 2 but embodying a second form of my invention.

In Figure 3 the knob 44, the pilot cam 72 and its pilot lamp circuit, the auto transformer 82, the two step thermostat switch and adjusting cam 58 as well as the surface heater 22 may be the same as in Figure 2. However this circuit differs principally in that it has three snap acting hot wire relays of the same type as the two in Figure 2 and all three terminals of the surface heaters individually contolled by these three relays. A slightly different interconnecting arrangement between the two step thermostat and the hot wires of the relays is used to provide three different lower heating rates following the initial heating or preheating cycle.

The terminals 147 of the surface heater 22 is connected by a conductor 220 to the toggle switch contact mechanism 222 of a normally open hot wire relay 224 which may be similar to the hot wire relays of Figure 2. This relay 224 may be connected by a flexible conductor 226 to a conductor 228 connecting with the live supply conductor L₁.

The intermediate terminal 157 between the low resistance section 161 and the high resistance section 159 of the surface heater 22 is connected by a conductor 230 to the contact mechanism 232 of a second hot wire relay 234. This hot wire relay 234 is connected through the conductor 236 to the supply conductor L₂. The terminal 151 of the surface heater 22 is connected to the toggle contact mechanism 238 of the hot wire relay 240. This relay 240 is connected by the conductor 242 to the neutral supply conductor N.

The first step thermostatic switch 48 is connected by the conductor and branch conductors 244 to the stationary contacts 246 and 248. The second step switch 50 of the thermostat is connected by the conductor and branch conductors 250 to the stationary contacts 252, 254 and 256. A double throw switch contact member 258 is located between and is movable into and out of contact with the stationary contacts 246 and 252. It is operated by the cam 260 fixed to the knob shaft 62 and provided with a cam surface 264 of intermediate radius engaging the follower of the switch member 258 when the knob 44 is turned to the off position to hold the switch member 258 in an intermediate position. The cam 260 has low portions throughout the greater portion of its periphery in positions contacted by the follower of switch member 258 when the knob 44 is turned on warm and low boil positions as well as on high boil and fry positions. In these positions the contact 258 will remain in contact with the contact 252 to connect the second step switch 50 to the hot wire element 266 of the hot wire relay 224 which is connected through the conductors 226 and 228 to the live supply conductor $L_1$. The cam 260 also has a high portion 268 of maximum radius between its low portions which is presented to the follower of the switch 258 when the knob 44 is turned to the medium boil position. This moves the contact 258 into contact with the contact 246 to connect the first step switch 48 through the conductor and the branch conductors 244 to the hot wire 266 of the relay 224.

Another cam 270 is fixed to the shaft 62 and has a portion 272 of intermediate radius which is presented to the follower of the movable switch contact member 274 in the off position to hold it intermediate the stationary contact 246 and 254. The cam 270 also has a portion of large radius which is presented to the follower of the switch member 274 in the warm and low boil positions of the knob 44 while a portion of small radius is presented to the follower of this switch member 274 in the medium boil, high boil and fry positions of the knob 44. Thus the cam 270 holds the contact member 274 in contact with the contact 246 in the warm and low boil positions of the knob 44 to connect with the first step thermostat switch 48 to the hot wire element 276 of the relay 234. This hot wire element 276 is connected by a flexible conductor 278 to the conductor 228 connecting with the live supply conductor $L_1$. This relay 234 controls the connection of the intermediate terminal 157 of the heater 22 to the live supply conductor $L_2$.

The cam 280 is likewise fixed to the knob shaft 62 and has a portion 282 of intermediate radius which is presented to the follower of the switch 284 in the off position of the knob 44. The cam 280 in the warm and low boil positions of the knob 42 presents a portion of large radius to the followers of the switch 284. This holds the switch 284 in contact with the stationary contact 256 to connect the second step thermostat 50 to the hot wire element 286 of the relay 240. This hot wire element 286 is connected by the flexible conductor 288 to the conductor 228 connecting with the live supply conductor $L_2$. When energized, the relay 240 closes the contacts 238 to connect the terminal 151 to the conductor 242 connecting with the live supply conductor $L_2$. In the medium boil and high boil and fry positions of the knob 44 the cam 280 is turned to present a portion of small radius to the follower of the switch member 284 to permit it to move into contact with the stationary contact 248. This contacts the first step thermostat 48 to the hot wire element 286 to cause the relay 240 to connect the terminal 151 to the conductor 242 connecting to the live supply conductor $L_2$.

During the preheat or warm up period in all positions of the knob 44, both the first and second step switches 48 and 54 will be closed. In the warm and low boil positions, the first step switch 48 will be connected through the contact 246 and switch 274 to the hot wire 276 of the relay 234 to connect the intermediate terminal 157 to the live supply conductor $L_2$. The second step thermostat 50 will be connected through the contact 252 and switch 258 to the hot wire 266 of the relay 224 to connect the terminal 147 to the live supply conductor $L_1$. This second step switch 50 will also be connected through the contact 256 and switch 284 to the hot wire 286 of the relay 240 to connect the terminal 151 with the neutral supply conductor N. This will connect the low resistance section 161 across the supply conductors N and $L_2$ to apply a potential of 118 volts. With a resistance of 27.7 ohms in the six inch unit this will provide a heat input of 500 watts while in the eight inch unit having a resistance of 20 ohms for this section, an input of 700 watts will be provided. The high resistance section will be connected across the supply conductors $L_1$ and $L_2$ to provide an input of 1000 watts at 236 volts with a resistance of 56 ohms for the six inch unit and to provide an input of 1350 watts at 236 volts with a resistance of 41.4 ohms for the eight inch unit. This makes a total wattage of 1500 watts for the six inch unit and 2050 watts for the eight inch unit.

*Operation of second form.—Warm and low boil*

When the knob 44 is in the warm and low boil positions and the thermostat bulb 34 reaches the temperature to which the knob 44 is set, the first step thermostat 48 will open to deenergize the hot wire element 276 causing the relay 234 to open the contacts 232 to disconnect the terminal 157 from the live supply conductor $L_2$. This will leave the low and high resistance sections 161 and 159 connected in series across the live supply conductor $L_1$ and the neutral supply conductor N upon a nominal wattage of 118 volts to provide a reduced heat rate of 170 watts for the six inch unit and 230 watts for the eight inch unit. This will be sufficient to keep warm the contacts of the vessel or receptacle 32. In the low boil position, this heat will be sufficient to raise the temperature from 200° to the boiling temperature to provide a slow boil with little evaporation. Should the vessel 32 boil dry or the temperature rise more than 25° above the opening temperature of the first step switch 48, the second step switch 50 will be opened to deenergize the hot wires 266 and 286 to cause the relays 224 and 240 to open to disconnect the other terminals of the heater 22 from the supply conductors. This will completely deenergize the heater 22 until the temperature of the bulb 34 is lowered to cause the reclosing of the second step switch 50.

*The medium boil position*

When the knob 44 is turned to the medium boil position, the cam 58 will be in a position to open the first step 48 at 200° and the second step switch 50 at 225° as it will also operate in the low and high boil positions. The cam 260 will present the high portion 268 to the follower of the switch 258 to move the switch 258 into contact with the stationary contact 246. The cam 270 will be turned to present a low portion to the follower of the switch 274 to cause it to be moved into engagement with the stationary contact 254. The cam 280 will continue to present a high portion to the follower of the switch 284 keeping it in contact with the stationary contact 256. During the first cycle warming or preheating period, all three hot wire elements 266, 276 and 286 will be energized to close all three relays to provide maximum energization of the surface heater 22. When the thermostat bulb 34 reaches a temperature of 200° F., the first step switch 48 will open to deenergize the hot wire element 266 to operate relay 224 to cause the opening of its contact 222 to disconnect its terminal 147 from the live supply conductor $L_1$. This will leave the low resistance section 161 connected across the supply terminal N and $L_2$ on 118 volts to provide a heat input of 500 watts for a six inch unit and 700 watts for an eight inch unit. This is sufficient to rapidly raise the temperature of the vessel 32 from 200° to the boiling point and keep the contents therein at a medium boil. The second step switch 50 will open at 225° and cycle at that temperature in the event that the vessel 32 boils dry to prevent burning of the contents.

The high boil position

The turning of the knob 44 to the high boil and fry positions will cause the cam 260 to again present the periphery of small radius to the follower of the switch 258 to cause the switch 258 to engage the stationary contact 252. The cam 270 will continue to present a perpiphery of small radius to the follower of the switch 274 to keep it in engagement with the contact switch 254. The cam 280 will also present a peripheral portion of small radius to the follower of the switch member 284 to cause it to move into engagement with the stationary contact 248.

Figure 4:
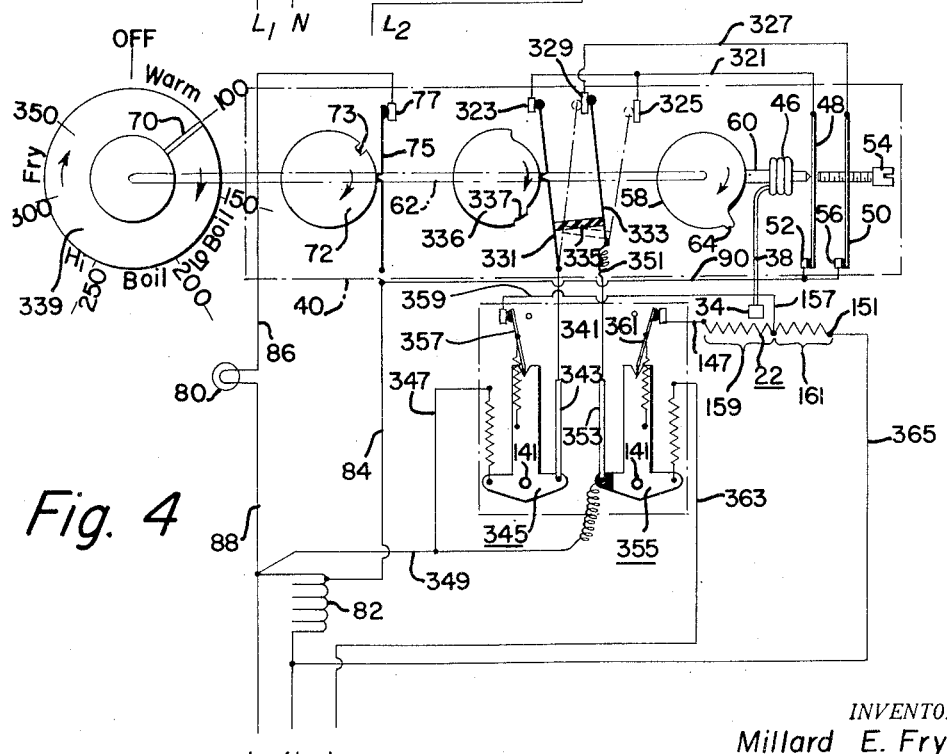
Figure 4 is a diagrammatic view similar to Figures 2 and 3 embodying a third form of my invention.

When the knob 44 is turned to the high boil or fry positions, all the relays will be energized as before to provide the maximum heat input to the surface heater 22. During the initial cycle the hot wires of all three relays will be energized to provide a preheating or warm up at the maximum input rate of 1500 watts for the six inch unit and 2050 watts for the eight inch unit. The rise in temperature of the bulb 32 to the temperature selected by the knob 44 will cause the first step switch 48 to be opened. When the temperature of the bulb 34 reaches the temperature for which the knob 44 is set, the first step switch 52 will be opened to deenergize the hot wire element 286 to cause the relay 240 to open the contacts 238 to disconnect the terminal 151 from the neutral supply conductor N. This will leave the high resistance section 159 connected across the two live supply conductors $L_1$ and $L_2$ upon a nominal voltage of 236 volts to provide a heat input of 1000 watts for the six inch unit and 1350 for the eight inch unit. This heat input rate is suitable and continuing the heating of the vessel 32 after the initial cycle for fast boiling and frying. If this heating rate is not sufficient the first step thermostat 48 will reclose to reenergize the unit 22 at its maximum input. If this heating rate is more than sufficient to maintain a selected temperature, the second step switch 50 will be opened to deenergize the remaining relays to disconnect all terminals of the heating unit 22 from the supply conductors. The switch 50 will then cycle.

with the stationary contact 329 as shown in full lines in Figure 4. As shown in dotted lines, when the contact 331 is in contact with the stationary contact 329 the contact 333 is in contact with the contact 325.

A cam 336 fixed to the knob shaft 62 has a portion 337 of intermediate radius for holding the switch members 331 and 333 in an intermediate position when the knob 339 is turned to the off position. When in a warm or low boiling position, a peripheral surface of small radius of the cam 336 will be presented to the follower of the switch 331 to allow it to move into engagement with the stationary contact 323 while the switch 333 will be allowed to move into engagement with the stationary contact 329. The switch contact 331 is connected by a conductor 341 to the hot wire element 343 of a snap acting hot wire relay 345. The hot wire relay 345 is connected by the conductors 347 and 349 to the live supply conductor $L_1$. The switch member 333 is connected by the conductor 351 to the hot wire element 353 of the snap acting hot wire relay 355. This hot wire relay 355 has its hot wire element insulated from the remainder of the relay and connected by a flexible conductor to the conductor 349 connecting with the live supply conductor $L_1$.

The warm and low boil range of the knob 339 and the adjusting cam 58 for the bellows or diaphragm 46 of the two step thermostat provides a range of temperatures up to 200° for separating the first step switch member 48 from the stationary contact 52. When this temperature is reached and the contact member 48 is opened, the hot wire relay 343 is deenergized to cause the relay 345 to open its toggle contact 357 to disconnect the terminal 157 and the conductor 359 from the conductors 347 and 349 connecting with the supply conductor $L_1$. This will leave the terminal 147 connected through the closed snap acting contacts 361 of the relay 355 which are connected through a conductor 363 to the other live supply conductor $L_2$. The terminal 151 is permanently connected by the conductor 365 to the neutral supply conductor N. Accordingly the high and low resistance heating units 159 and 161 are connected in series across the neutral supply conductor and the live supply conductor $L_2$ at a potential of 118 volts to provide a reduced heat input of 170 watts for the six inch unit and 230 watts

THE THIRD FORM

Contact chart

| Pos. | Sections | | Contacts | | | | | | | |
|---|---|---|---|---|---|---|---|---|---|---|
| | 159 | 161 | 48 52 | 50 56 | 351 | 361 | 331 323 | 331 329 | 333 329 | 333 325 |
| Off | 0 | 0 | Open | Open | Open | Open | Open | Open | Open | Open |
| PH Low | 236 v. series | 118 v. | Close Open | Close Close | Close Open | Close Close | Close Close | Open Open | Close Close | Open Open |
| PH High | 236 v. 0 | 118 v. 118 v. | Close Open | Close Close | Close Close | Close Open | Open Open | Close Close | Open Open | Close Close |

In the third form illustarted in Figure 4, the cam 72, the pilot light circuit, the auto transformer 82, the surface heater 22 and the two step thermostat may be the same as is shown in the Figures 1 to 3. The second step thermostat switch 48 is connected by the conductors 321 to the stationary contacts 323 and 325. The second step thermostat switch 50 is connected by the conductor 327 to a stationary contact 329. A double throw contact member 331 operates between and makes contact with the stationary contacts 323 and 329. A second double throw contact member 333 operates between and is adapted to make contact with the stationary contacts 329 and 325. The contacts 331 and 333 are linked together by an insulating link 335 so that when the contact 331 is in contact with the contact 323 the contact 333 is in contact for the eight inch unit. As in the other two forms a rise of 25° or more above the selected temperature will cause the opening of the second step switch 50 to deenergize the hot wire element 353 to allow the relay 355 to open the toggle contact mechanism 361 to disconnect the terminal 147 from the live supply conductor $L_2$. This will leave the surface heater 22 connected only to the neutral supply conductor N to accomplish full deenergization.

When the knob 339 is turned to any position above 200° F. the cam 336 will present a peripheral portion of maximum radius to the follower of switch member 331 to move it into contact with the stationary contact 329 and to move the contact member 333 into contact with the stationary contact 325. Preferably, the cam 58 is provided with a portion of constant radius correlated with the positioning of the knob 339 at 200°. This makes it possible to cause the cam 336 to move the switch members 331 and 333 to either position at the 200° point. Whenever the bulb 34 reaches a temperature to which the knob 339 is set above 200° F. so that the switch members 331 and 333 are in the dotted line positions, the opening of the first step switch 48 will deenergize the hot wire element 353 to cause the relay 355 to open the contacts 361 to disconnect the terminal 147 of the heater 22 from the live supply conductor L₂. This will deenergize the high resistance section 159 and leave the low resistance 161 connected across the supply conductors L₁ and N to provide a maximum input of 500 watts for the six inch unit and 700 watts for the eight inch unit. If this reduced heat is insufficient to maintain the temperature of the cooking vessel 32, the first step switch 38 will close to reconnect the terminal 147 to the live supply conductor L₂. If this heat is more than sufficient to maintain the selected temperature, the rise in temperature of the bulb 34 will cause the second step switch 50 to open to deenergize the hot wire element 333 to cause the switch contacts 357 to disconnect the terminal 157 from the live supply conductor L₁. This will deenergize the unit 22 as before.

THE FOURTH FORM

*Contact chart*

| Pos. | Sections | | Watts | Contacts | | | | |
|---|---|---|---|---|---|---|---|---|
| | 424 | 426 | | 452 | 464 468 | 464 470 | 438 440 | 438 446 |
| Off | 0 | 0 | 0 | Open | Close | Open | Close | Open |
| PH Low | 236 v. 118 v. | 236 v. 0 | 1,600 200 | Close Close | Open Close | Close Open | Open Close | Close Open |
| PH Med | 236 v. 118 v. | 236 v. 118 v. | 1,600 400 | Close Close | Open Close | Close Open | Open Open | Close Close |
| PH High | 236 v. 0 | 236 v. 236 v. | 1,600 800 | Close Open | Open Open | Close Close | Open Open | Close Close |

*Contact chart*

| Pos. | Sections | | Contacts | | | | | | | |
|---|---|---|---|---|---|---|---|---|---|---|
| | 424 | 426 | 48 52 | 50 56 | 480 482 | 480 484 | 486 484 | 486 488 | 490 492 | 490 494 |
| Off | 0 | 0 | Open | Open | Open | Open | Open | Open | Open | Open |
| PH Low | 236 v. 118 v. | 236 v. 0 | Close Open | Close Close | Close Close | Open Open | Close Close | Open Open | Open Open | Close Close |
| PH Med | 236 v. 118 v. | 236 v. 118 v. | Close Open | Close Close | Close Close | Open Open | Close Close | Close Open | Close Close | Open Open |
| PH High | 236 v. 0 | 236 v. 236 v. | Close Open | Close Close | Open Open | Close Close | Open Open | Close Close | Close Close | Open Open |

Figure 5:
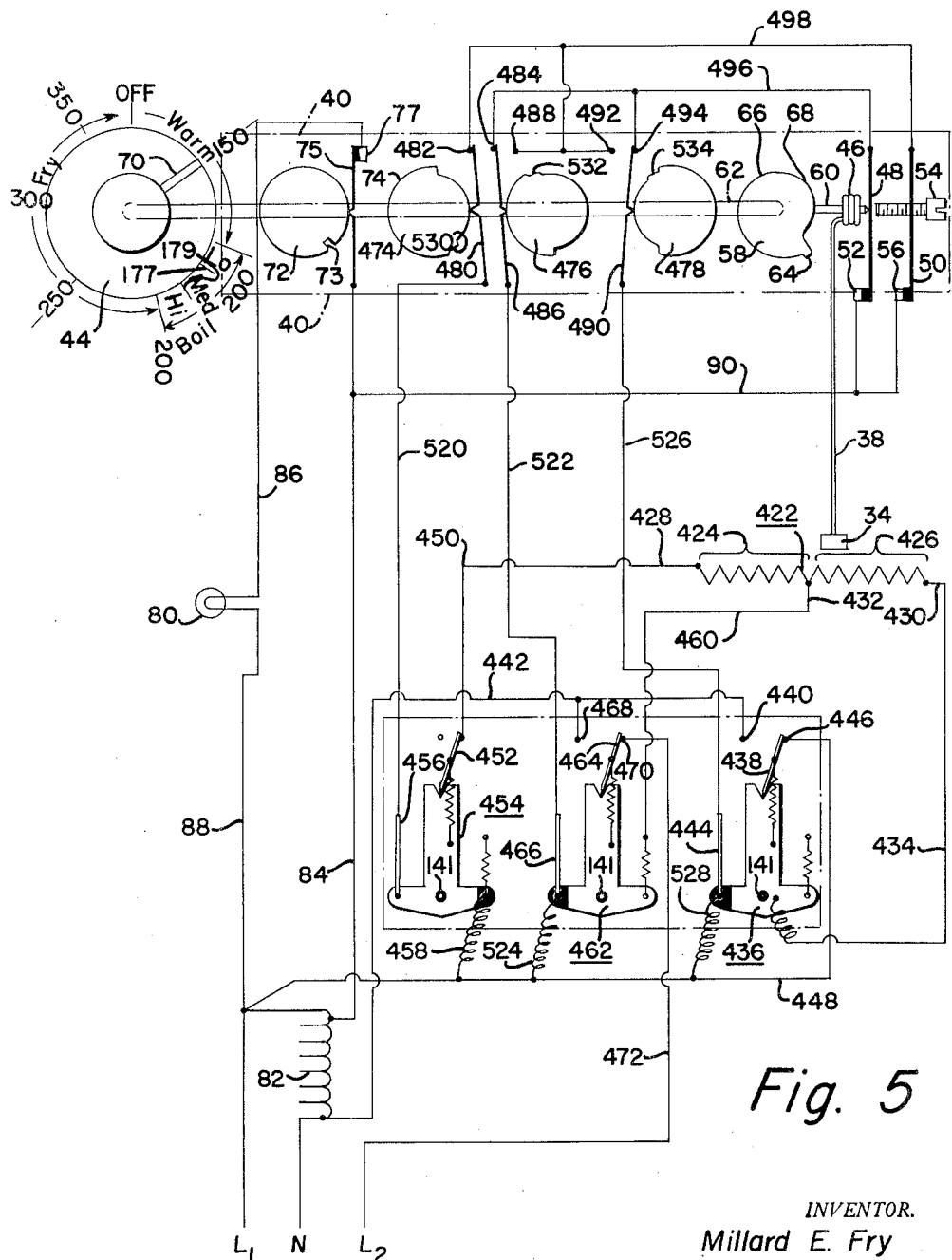
Figure 5 is a diagrammatic view similar to Figures 2 and 4 embodying a fourth form of the invention.

In Figure 5 the knob 44, the pilot cam 72 and its pilot lamp circuit, the auto transformer 82, the two step thermostat switch and adjusting cam 58 may be the same as described in connection with Figures 2 and 3. The surface heater 422 however, although of the same general type, is divided into two equal sections 424 and 426 with end terminals 428 and 430 and a center tap terminal 432. For the six inch surface unit the sections each have a resistance of 70 ohms to provide a maximum input of 800 watts at 236 volts. For an eight inch unit the sections each have a resistance of 44.8 ohms to provide a maximum input of 1025 watts at 236 volts. The thermostat bulb 34 is similarly located in the center of the surface heater and spring mounted in the manner illustrated in Figure 1. This form differs from the other forms in that two of the three hot wire relays are provided with double throw contacts. This arrangement makes it possible to get heats of ½, ¼ and ⅛ the maximum heat from the unit following the initial preheat (pH) period.

The terminal 430 of the surface heat unit 422 is conducted through the conductor 434 and to the hot wire relay 436. The hot wire relay 436 has a snap acting double throw contact mechanism 438 adapted in its cold deenergized position to make contact with the stationary contact 440 connected by the conductor 442 to the neutral supply conductor N. When the hot wire 444 is energized, the contact member 434 is moved into engagement with the stationary contact 446 which is connected through the conductor 448 with the conductor 88 connecting to the live supply conductor L₁. The relay 436 may be similar to the relays described in connection to Figures 1 and 2 excepting that the movable contact 438 is of the double throw type and makes engagement with the contact 440 when deenergized and with the contact 446 when energized.

The terminal 428 is connected by the conductor 450 to the snap acting contact mechanism 452 of the relay 454 which is like the relays 167, 224 and 245 in Figures 2 and 4. When the hot wire 456 is energized, the contact mechanism of the relay 452 is closed. When it is deenergized the contact 452 is open. The relay 454 is connected by a flexible conductor 458 with the conductor 448 connecting with the live supply conductor L₁.

The intermediate terminal 432 is connected by a conductor 460 to the relay 462 provided with a double throw snap acting contact mechanism 464. This relay 462 has a hot wire element 466 which when cold moves the relay so that contact 464 contacts the stationary contact 468 connected by the conductor 442 to the neutral supply conductor N. When the hot wire 466 is energized, it will move the relay 462 to cause the contact member 464 to move into engagement with the stationary contact 470 which is connected through the conductor 472 to the live supply conductor L₂.

The knob shaft 62 has fixed thereon the cams 474, 476 and 478 which are somewhat similar to the cams 260, 270 and 280 previously described. The cam 474 is adapted to operate the switch contact member 480 into contact with either of the stationary contacts 482 or 484. The cam 476 is adapted to operate the contact member 486 into contact with the stationary contacts 484 or 488. The double throw contact member 490 is operated by the cam 478 into engagement with either of the stationary contacts 492 or 494.

The first step thermostat switch member 48 is connected through the conductor 496 with the stationary contacts 484 and 494. The second step switch member 50 is connected through the conductor 498 with the stationary contacts 482, 488 and 494. The double throw switch member 480 is connected through the conductor 520, the hot wire element 456, the relay 454 and the conductor 458 to the supply conductor L₁. The double throw contact member 486 is connected by the conductor 522 through the hot wire element 466 which is insulated from the relay 462 but connected through the flexible conductor 524 to the conductor 448 also connecting with the supply conductor L₁. The double throw switch contact member 490 is connected through the conductor 526 to the hot wire element 444 which is electrically insulated from the relay 436 but connected through the flexible conductor 528 with the conductor 448 connected with the supply conductor L₁.

*Operation of the fourth form*

The cams 474, 476 and 478 have portions 530, 532 and 534 of intermediate radius holding the switch members 480, 486 and 490 in an intermediate position out of contact with the stationary contacts 482, 484, 488, 492 and 494 when the knob 44 and the shaft 62 are in the off position. This will cause the relays 454, 462 and 436 to be deenergized thereby connecting the terminals 430 and 432 of the heater 424 to the neutral supply conductor N while the terminal 438 is disconnected by the relay 454 from the live supply conductor L₁.

*Warm and low boil*

When the knob 44 is turned from the off position to any position within the warm and low boil range up to the point indicated by the reference character 177, the cam 474 will present a portion of small radius to the follower of the switch member 480 to move it into engagement with the stationary contact 482. The cam 476 will present a portion of large radius to the follower of the switch member 486 to cause it to engage the stationary contact 484. The cam 478 will present a portion of small radius to the switch member 490 to hold it in engagement with the stationary contact 494. The cam 58 will adjust the position of the diaphragm or bellows 46 to cause the switch member 48 to open when the thermostat bulb 34 reaches the temperature for which the knob 44 may be set. This will include any temperature within the range of operation up to and including 200° F.

Before this temperature is reached, low voltage current from the conductors 84 and 90 will pass through the switch member 48 through the conductor 496, switch members 486 and 490, the conductors 522 and 526, the hot wire elements 456 and 444 to the conductor 448 connecting to the live supply conductor L₁. This will energize both relays 462 and 436 to cause their contact members 464 and 438 to move into engagement with their stationary contacts 470 and 446. This will connect the terminal 430 of the heater 422 through the conductor 434, the relay 436, the contacts 438 and 446 and the conductor 448 to the live supply conductor L₁. The energization of the relay 462 will connect the intermediate terminal 432 through the conductor 460, the relay 462, the contacts 464 and 470 and the conductor 472 with the live supply conductor L₂.

The second step switch member 50 connects the conductor 90 through the conductor 498, the switch member 480, the conductor 520 through the hot wire element 456, the relay 454, the conductors 458 and 448 to the live supply conductor L₁. This energizes the relay 454 to connect the terminal 428 through the conductor 450, the contact mechanism 452, the relay 454 and the conductors 458 and 448 to the live supply conductor L₁. Thus during the preheat period both sections 424 and 426 are connected across the live supply conductors L₁ and L₂ to provide a maximum input of 800 watts each for the first or preheat cycle.

When the thermostat bulb 34 reaches the temperature for which the knob 44 is set, the switch member 48 will be opened to deenergize the hot wire elements 466 and 444 to operate the relays 462 and 436 to cause the movable contacts 464 and 438 to return to engagement with the contacts 468 and 440. This will connect the terminal 430 through the conductor 434, the relay 436, the contacts 438 and 440 and the conductor 442 to the neutral supply conductor N. The terminal 432 will likewise be connected through the conductor 460, the relay 462, the contacts 464 and 468 and the conductor 442 to the neutral supply conductor N. The hot wire 456 alone remains energized and keeps the terminal 428 connected through the relay 454 to the live supply conductor L₁. This will connect the section 424 between the supply conductors L₁ and N upon a voltage of 118 volts to provide a heat input of 200 watts for the six-inch unit and 265 watts for the eight-inch unit. The section 426 will be deenergized since both terminals 430 and 432 are connected through the relays 462 to the neutral supply conductor N.

*Medium boil*

When the knob 44 is turned with the indicator 70 located in the medium boil position between the reference characters 177 and 179, the cam 58 will be turned to present the portion between the reference characters 66 and 68 to the follower 60 to cause the switch member 48 to be opened at a temperature of 200° F. while the switch member 50 will open at a temperature of 225° F. This position of the knob 44 will cause the high portion of the cam 478 to engage the follower of the switch member 490 to move it into engagement with the stationary contact 492. The follower of the switch members 480 and 486 will remain on the low and high portions of their respective cams to maintain their positions unchanged. In the medium boil position during the preheat period, the conductor 90 will be connected through the switch member 480, the conductor 496, the contact member 486, the conductor 522 through the hot wire element 466 and the conductors 524 and 448 to the live supply conductor L₁. The conductor 90 will be connected also through the switch member 50, the conductor 498, the switch members 480 and 490, the conductors 520 and 526, to the hot wire elements 456 and 462 and through the conductors 458 and 528 and through the conductor 448 to the live supply conductor L₁. This will energize the relays 454 and 436 to connect the terminal 428 to the live supply conductor L₁ and the terminal 432 to the live supply conductor L₂. The energization of the hot wire element 444 will operate the relay 436 to connect the terminal 430 to the live supply conductor L₁. This will again impress a voltage of 236 volts upon each of the sections 424 and 426 to provide a total wattage of 1600 watts for the six inch unit and 2050 for the eight inch unit.

When the thermostat bulb 34 reaches a temperature of 200° F. the switch 48 will open to disconnect the hot wire element 466 from the transformer output to cause the relay 462 to move its contact member 464 back into engagement with the stationary contact 468. This will connect the middle terminal 432 through the relay 464 and the conductor 442 to the neutral supply conductor N. This will leave both sections 424 and 426 connected across the supply conductor L₁ and N to provide a maximum input of 200 watts each for a total of 400 watts for the six inch unit and 265 each for a total of 510 watts for the eight inch unit.

*High boil and fry*

When the knob 70 is turned to move the indicator 70 beyond the reference character 179 to the high boil or fry positions, the cam 58 may either remain in the 200° F. adjustment for high boil or it may be turned to higher temperature for different types of frying. When the knob is turned beyond the point indicated by the reference character 179, the cam 474 presents a portion of the large radius to the follower of the switch member 480 to move it into engagement with the stationary contact 484. The cam 476 at the same time presents a portion of small radius to the follower of the switch member 486 to move it into engagement with the stationary contact 488. Also at the same time the cam 478 presents a portion of large radius to the switch member 490 to move it into engagement with the stationary contact 492.

During the preheat period when the contacts 48 and 50 are closed, the switch member 48 will be connected through the conductor 496 and the contact 484, the switch member 480, the conductor 520, the hot wire element 456, the relay 454 and the conductors 458 and 448 to the live supply conductor L₁. At the same time the contact member 50 will be connected to the conductor 498 and the contacts 488 and 492 through the switch members 486 and 490, the conductors 522 and 526, the hot wire elements 466 and 444, the conductors 524, 528 and 458 to the live supply conductor L₁. This will energize all three relays 454, 462 and 436. The energization of the relay 456 will cause the terminal 428 to be connected through the conductor 450, the contacts 452, the relay 454 and the conductors 458 and 448 to the supply conductors L₁. The energization of the relay 462 will cause the middle terminal 432 to be connected through the conductor 460, the relay 462, the contacts 464 and 470 and the conductor 472 to the live supply conductor L₂. The energization of the relay 436 will cause the terminal 430 to be connected through the conductor 434, the relay 436, the contacts 438 and 446 and the conductor 448 to the live supply conductor L₁. As in the preheats in connection with low and medium boil the sections 424 and 426 will be connected across the live supply conductors L₁ and L₂ in parallel to provide the maximum input of 800 watts each for the six inch unit and 1025 each for the eight inch unit.

When the thermostat bulb 34 reaches the temperature for which it is set, the diaphragm 46 will open the switch member 48 to deenergize the hot wire element 456. This will cause the relay 454 to open the switch member 452. This will disconnect the terminal 428 from the supply conductor L₁ to deenergize the section 424. This however will leave the section 426 connected across the supply conductors L₁ and L₂ at 236 volts to provide a maximum input of 800 watts for the six inch unit and 1025 watts for the eight inch unit. Should the temperature of the bulb 34 rise more than 25° above the opening temperature of the switch 48 the switch 50 will open to deenergize the hot wire elements 466 and 444. This will move the contact members 464 and 438 into engagement with the stationary contacts 468 and 440 to connect the terminal 432 and 430 to the neutral supply conductor N. This will effectively deenergize the heating unit 422 until the temperature falls sufficiently to reclose the contact 50. Cycling will then take place to maintain a temperature substantially 25° higher than the opening temperature of the switch member 48.

Thus in the four different forms, I have provided an automatic thermostat control and surface heater in which form one to three reduced heats can be obtained automatically at the end of the first heating cycle. In each of the forms at least two reduced heating rates are obtainable in the boiling range. The control maintains a temperature selected within a range of about 25° F. and protects the food from becoming overheated. The use of the two step thermostat in a low pilot voltage circuit prevents drifting of the calibration and prolongs the life of the thermostats. The use of the hot wire relays provides a simple quiet form of relay which avoids the expense and difficulties encountered with the magnetic relay. However magnetic relays may be substituted if desired. The controls allow cooking on surface heaters with a minimum of attention and thus simplifies the preparation of meals.

In accordance with the provisions of rule 78a, reference is made to the following prior filed application S. N. 407,642, filed February 2, 1954.

While the form of embodiment in the invention as herein disclosed constitutes a preferred form, it is to be understood that other forms might be adopted, as may come within the scope of the claims which follow.

What is claimed is as follows:

1. An electrical heating system for heating receptacles on the top of a support including power supply conductors, an electric surface heating means having connected sections, an adjustable two step thermostat substantially responsive to the temperature of any receptacle upon said surface heating means, said thermostat having successively operating, automatically reclosing first and second step switches and having means for operating said second switch at a uniform substantial temperature difference above the operating temperature of the first step switch, a first relay having a switch mechanism connecting the terminal of one of said heating sections to a first of said supply conductors, a second relay having a switch mechanism connecting the connection between said heating sections to a second supply conductor, said first relay having an operating element controlled by said second step switch, said second relay having an operating element controlled by said first step switch, and means connecting the terminal of a second heating section to one of the supply conductors, said thermostat having an adjusting means for adjusting the temperatures of operation of said step switches, means responsive to the operation of said adjusting means for connecting the operating element of said first relay to said first step switch and for connecting the operating element of said second relay to said second step switch.

2. An electrical heating system for heating receptacles on the top of a support including power supply conductors, an electric surface heating means having connected sections, an adjustable two step thermostat substantially responsive to the temperature of any receptacle upon said surface heating means, said thermostat having successively operating, automatically reclosing first and second step switches and having means for operating said second switch at a uniform substantial temperature difference above the operating temperature of the first step switch, said heating means having terminals connected to the common connection and to the unconnected ends of said sections, conducting means connecting said ends and the connection between the sections to said power supply conductors, first means responsive to the opening of the first step switch for disconnecting one of said terminals from one of said conductors, second means responsive to the opening of the second step switch for disconnecting another of said terminals from another of said conductors, and interchanging switch means for said first and second means for causing said first means to be responsive to the opening of said second step switch and for causing said second means to be responsive to the opening of said first step switch.

3. An electrical heating system for heating receptacles on the top of a support including electric surface heating means having connected sections, power supply conductors having connections to a connection between the sections and to ends of the sections, a two step thermostat substantially responsive to the temperature of any receptacle upon said surface heating means, said thermostat having successively operating, automatically reclosing first and second step switches and having means for operating said second step switch at a uniform substantial temperature difference above the operating temperature of the first step switch, one of said sections having a low resistance and another having a high resistance, interconnecting control means having a first position providing a connection for causing the operation of said first step of said thermostat to disconnect the connection between the sections from one of the power supply conductors and having a second position providing a connection for causing the operation of said first step of said thermostat to disconnect the end of the low resistance section from one of the power supply conductors and having a third position providing a connection for causing the operation of the first step of said thermostat to disconnect the end of the high resistance section from one of the power supply conductors, said control means also having means responsive to the operation of the second step for deenergizing said high and low resistance sections.

4. An electrical heating system for heating receptacles on the top of a support including power supply conductors, an electric surface heating means having connected sections, an adjustable two step thermostat substantially responsive to the temperature of any receptacle upon said surface heating means, said thermostat having successively operating first and second step switches, a first relay having a switch mechanism connecting the terminal of one of said heating sections to a first of said supply conductors, a second relay having a switch mechanism connecting the connection between said heating sections to a second supply conductor, said first relay having an operating element controlled by said second step switch, said second relay having an operating element controlled by said first step switch, said heating means having a low resistance section connected to a high resistance section, a third relay having a switch mechanism connecting the terminal of said high resistance section to one of the supply conductors, and control connection changing means between the operating elements of said relays and said step switches having a second position operatively connecting the first step switch to the operating element of said first relay and operatively connecting the second step switch to the operating elements of said second and third relays.

5. An electrical heating system for heating receptacles on the top of a support including power supply conductors, an electric surface heating means having connected sections, an adjustable two step thermostat substantially responsive to the temperature of any receptacle upon said surface heating means, said thermostat having successively operating first and second step switches, a first relay having a switch mechanism connecting the terminal of one of said heating sections to a first of said supply conductors, a second relay having a switch mechanism connecting the connection between said heating sections to a second supply conductor, said first relay having an operating element controlled by said second step switch, said second relay having an operating element controlled by said first step switch, said heating means having a low resistance section connected to a high resistance section, a third relay having a switch mechanism connecting the terminal of said high resistance section to one of the supply conductors, and control connection changing means between the operating elements of said relays and said step switches having a second position operatively connecting the first step switch to the operating element of said first relay and operatively connecting the second step switch to the operating elements of said second and third relays, said changing means also having a third position operatively connecting the first step switch to the operating element of said third relay and operatively connecting the second step switch to the operating elements of said first and second relays.

6. An electrical heating system for heating receptacles upon the top of a support including a three wire single phase alternating current power supply having two live and one neutral supply conductors, an electric surface heating means having connected sections with terminals at their ends, a step down transformer having its input terminals connected to the neutral and one of the live supply conductors and having a low voltage output terminal, means including a plurality of independently operable electrical relays for independently connecting said terminals to said supply conductors, said relays each having operating elements and switch means, an adjustable two step thermostat substantially responsive to the temperature of any receptacle upon the surface heating means, said thermostat having successively operating, automatically reclosing first step and second step switches electrically connected in series with the operating elements of said relays to said low voltage output terminal in two parallel circuits for operating said switch means to control the connections of said terminals with said supply conductors, said thermostat having means for operating said second step switch at a uniform substantial temperature difference above the operating temperature of the first step switch.

7. An electrical heating system for heating receptacles upon the top of a support including a three wire single phase alternating current power supply having two live and one neutral supply conductors, an electric surface heating means having connected sections with terminals at their ends, a step down transformer having its input terminals connected to the neutral and one of the live supply conductors and having a low voltage output terminal, means including a plurality of independently operable electrical relays for independently connecting said terminals to said supply conductors, said relays each having operating elements and switch means, an adjustable two step thermostat substantially responsive to the temperature of any receptacle upon the surface heating means, said thermostat having successively operating, automatically reclosing first step and second step switches electrically connected in series with the operating elements of said relays to said low voltage output terminal in two parallel circuits for operating said switch means to control the connections of said terminals with said supply conductors, and means responsive to the adjustment of said thermostat for interchanging electrical connections between said first and second step switches and said operating means, said thermostat having means for operating said second step switch at a uniform substantial temperature difference above the operating temperature of the first step switch.

8. An electrical heating system for heating receptacles on the top of a support including power supply conductors, an electric surface heating means having connected sections, an adjustable two step thermostat substantially responsive to the temperature of any receptacle upon said surface heating means, said thermostat having successively operating automatically reclosing first and second step switches and having means for operating said second step switch at a uniform substantial temperature difference above the operating temperature of the first step switch, said thermostat having an adjusting means having a range of adjustment having means increasing opening temperatures for said first and second step switches in the first and last portions of its range and for providing substantially constant opening temperatures of said switches throughout a substantial intermediate portion of its range, means responsive to the operation of said first step switch for reducing the heating rate of said surface heating means, selective control means interconnected with said first step switch and said surface heating means having first, second and third positions for providing three different heating rates of said surface heating means upon operation of said first step switch means, said adjustment means having means effective in the middle part of said intermediate portion of its range for moving said selective control means to its second position and having means effective in said first portion and the first part of the intermediate portion of its range for moving said selective control means to its first position and having means effective in said last portion and the last part of the intermediate portion of its range for moving said selective control means to its third position.

9. An electrical heating system for heating receptacles on the top of a support including power supply conductors, an electric surface heating means for supporting and heating said receptacles and having connected sections, an adjustable two-step thermostat having a thermosensitive contact element resiliently mounted within said heating means and having an upwardly facing contact surface resiliently pressed against the bottom surface of any receptacle supported upon the heating means so as to be substantially responsive to the temperature of any receptacle upon said surface heating means, said thermostat having successively opening and successively automatically reclosing first and second step switches and having means effective upon a rise in temperature of the thermosensitive element for opening said second switch at a uniform substantial temperature difference above the opening temperature of the first step switch and for closing said second switch at substantially the same temperature difference above the closing temperature of the first step switch, a first relay having a switch mechanism connecting and disconnecting the terminal of one of said heating sections to and from a first of said supply conductors, a second relay having a switch mechanism connecting and disconnecting the connection between said heating sections to and from a second supply conductor, said first relay having an operating element controlled by said second step switch, said second relay having an operating element controlled by said first step switch, and means connecting another terminal of a second heating section to one of the supply conductors.

10. An electrical heating system for heating receptacles on the top of a support including electric surface heating means having connected sections, power supply conductors having connections to a connection between the sections and to ends of the sections, a two-step thermostat substantially responsive to the temperature of any receptacle upon said surface heating means, said thermostat having successively operating automatically restoring first and second steps with a temperature increment between their operation and having means responsive to the operation of the first step of said thermostat for disconnecting one of the connections with the power supply conductors, said thermostat having means responsive to the operation of the second step for disconnecting another of said connections with the power supply conductors, and interchanging means for the operative connections between the two steps of said thermostat and said one and said another supply conductors for interchanging the operation of said first and second steps relative to the disconnecting of said connections with said one and said another supply conductors.

References Cited in the file of this patent
UNITED STATES PATENTS

| | | |
|---|---|---|
| 1,528,053 | Hands | Mar. 3, 1925 |
| 2,137,073 | Bletz | Nov. 15, 1938 |
| 2,302,603 | Davis et al. | Nov. 17, 1942 |
| 2,331,535 | Candor | Oct. 12, 1943 |
| 2,403,824 | Newell | July 9, 1946 |
| 2,409,414 | Bletz | Oct. 15, 1946 |
| 2,409,434 | Jacobs | Oct. 15, 1946 |
| 2,434,467 | McCormick | Jan. 13, 1948 |